(12) United States Patent
Mol

(10) Patent No.: US 9,217,751 B2
(45) Date of Patent: Dec. 22, 2015

(54) KINEMATIC-STATE ENCODER WITH MAGNETIC SENSOR AND TARGET OBJECT HAVING A PLURALITY OF INTERLOCKING SEGMENTS

(75) Inventor: Hendrik Anne Mol, Sleeuwijk (NL)

(73) Assignee: AKTIEBOLAGET SKF, Gothenburg (SE)

( * ) Notice: Subject to any disclaimer, the term of this patent is extended or adjusted under 35 U.S.C. 154(b) by 582 days.

(21) Appl. No.: 13/575,631

(22) PCT Filed: Feb. 2, 2010

(86) PCT No.: PCT/EP2010/000595
§ 371 (c)(1),
(2), (4) Date: Aug. 5, 2013

(87) PCT Pub. No.: WO2011/095179
PCT Pub. Date: Aug. 11, 2011

(65) Prior Publication Data
US 2013/0307530 A1  Nov. 21, 2013

(51) Int. Cl.
*G01B 7/30* (2006.01)
*G01P 3/487* (2006.01)
*G01D 5/14* (2006.01)
*G01D 5/20* (2006.01)
*G01D 5/245* (2006.01)

(52) U.S. Cl.
CPC .............. *G01P 3/487* (2013.01); *G01D 5/145* (2013.01); *G01D 5/2013* (2013.01); *G01D 5/245* (2013.01)

(58) Field of Classification Search
CPC ..... G01D 5/145; G01D 5/2013; G01D 5/245; G01P 3/487
USPC .......................................... 324/207.2–207.25
See application file for complete search history.

(56) References Cited

U.S. PATENT DOCUMENTS 4,002,937 A    1/1977  Anson
4,907,445 A *  3/1990  Okumura ................... 73/115.08
(Continued)

FOREIGN PATENT DOCUMENTS

EP    1283337 A2   2/2003
GB    2317705 A    4/1998

OTHER PUBLICATIONS

Single-Track Gray Codes Alain P. Hiltgen, Kenneth G. Paterson, Marco Brandestini IEEE Transactions on Information Theory vol. 42, No. 5, pp. 1555-1561, Sep. 1996.

*Primary Examiner* — Jay Patidar
(74) *Attorney, Agent, or Firm* — Bryan Peckjian; SKF USA Inc. Patent Dept.

(57) ABSTRACT

An apparatus (1000) comprises a first physical component (1004), a second physical component (1006) and a sensor arrangement. The first and second physical components move relative to one another in operational use of the apparatus. The sensor arrangement senses a relative kinematic state of the first and second physical components. The sensor arrangement comprises a magnet (110) and a sensor (112). The sensor senses a property of a magnetic field of the magnet at a location of the sensor. The sensor is mounted stationary with respect to the first physical component. The sensor arrangement comprises a target object (114), mounted stationary with respect to the second physical component. The target object is configured for affecting an attribute of the property in dependence on the relative kinematic state. According to the invention target object (114) comprises a plurality of interlocking, segments.

9 Claims, 11 Drawing Sheets

(56) References Cited

U.S. PATENT DOCUMENTS

| | | | |
|---|---|---|---|
| 5,214,722 A * | 5/1993 | Faye et al. | 384/448 |
| 5,351,028 A * | 9/1994 | Krahn | 338/32 R |
| 5,614,822 A * | 3/1997 | Sakamoto et al. | 324/174 |
| 6,051,969 A | 4/2000 | Kobayashi et al. | |
| 6,246,232 B1 * | 6/2001 | Okumura | 324/207.2 |
| 2002/0175673 A1 * | 11/2002 | Butzmann | 324/174 |
| 2002/0175678 A1 * | 11/2002 | Butzmann | 324/207.25 |
| 2003/0122542 A1 * | 7/2003 | Koga et al. | 324/207.21 |
| 2009/0315543 A1 * | 12/2009 | Guo et al. | 324/207.21 |
| 2009/0315544 A1 * | 12/2009 | Takahashi et al. | 324/207.25 |
| 2010/0019761 A1 * | 1/2010 | Ueno et al. | 324/207.25 |
| 2010/0114523 A1 * | 5/2010 | Waite et al. | 702/151 |
| 2012/0293167 A1 * | 11/2012 | Kitanaka et al. | 324/207.25 |

* cited by examiner

KINEMATIC-STATE ENCODER WITH MAGNETIC SENSOR AND TARGET OBJECT HAVING A PLURALITY OF INTERLOCKING SEGMENTS

CROSS-REFERENCE

This application is the US national stage of International Application No. PCT/EP2010/000595 filed on Feb. 2, 2010, which is herein incorporated by reference.

FIELD OF THE INVENTION

The invention relates to an apparatus comprising a system with a first physical component, a second physical component and a sensor arrangement configured for sensing a relative kinematic state of the first and second physical components. The invention further relates to a system for use in such an apparatus, to a sensor arrangement for use in such an apparatus, to a target object for use in the sensor arrangement, and to a segment for use in the target object.

BACKGROUND ART

The following terminology is used in this text. The expression "kinematic state of a physical component" refers to the position, and/or velocity, and/or acceleration of the physical component with respect to some pre-determined reference system. The expression "relative kinematic state of two physical components" refers to the position, and/or velocity and/or acceleration of the physical components relative to each other. The expression "kinematic quantity" is used in this text to refer to a physical quantity representative of the kinematic state.

The relative kinematic state of two physical components can be measured using any of a variety of sensing techniques. An example of a known sensing technique is based on determining the strength of a magnetic field, or a rate of change in the magnetic field strength, as a representative of relative position or of relative velocity of a first physical component relative to a second physical component. Magnetic sensing is an example of a remote sensing technique. That is, it is contactless in that a magnetic sensor arrangement does not introduce any physical contact with the first and second components. As a result, a magnetic sensor arrangement is practically insusceptible to, e.g., the accumulation of dirt on the components, to the presence of lubricants and, if properly designed, to magnetic fields from an external source.

U.S. Pat. No. 6,051,969 discloses a sensor rotor for detecting wheel speed. The sensor rotor comprises a magnetized ring. The magnetized ring comprises a plurality of ring pieces having outer and inner edges that are identical in radius of curvature to each other. The ring pieces are arranged in the shape of a ring. The magnetized ring is made by magnetizing in such a manner that opposite magnetic poles are formed alternately in the circumferential direction thereof. The sensor rotor also has a press-in ring to the inside of which the magnetized ring is fixed.

SUMMARY OF THE INVENTION

An embodiment of the invention relates to an apparatus comprising a system with a first physical component, a second physical component and a sensor arrangement. The first physical component and the second physical component are configured for moving relative to one another in operational use of the apparatus. The sensor arrangement is configured for sensing a relative kinematic state of the first physical component and the second physical component. The sensor arrangement comprises a magnet and a sensor. The sensor is operative to sense a property of a magnetic field of the magnet at a location of the sensor. The sensor is mounted stationary with respect to the first physical component. The sensor arrangement comprises a target object that is mounted stationary with respect to the second physical component. The target object is configured for affecting an attribute of the property in dependence on the relative kinematic state. The target object comprises a plurality of interlocking segments.

The qualifier "interlocking" is used to indicate that the segments have been shaped, e.g., at the portions where they interface with one another, so that they engage through, e.g., hooking, meshing, dovetailing, etc.

This interlocking is explained as follows. Adjacent ones of the interlocking segments necessarily have a seam, or an air gap, between them. The air gap is preferably kept small enough to keep the error in the relative kinematic state low as determined through the magnetic sensing. Consider the surface area of that portion of a specific one of the segments that faces another portion of an adjacent one of the segments, i.e., consider the surface area of the interface of adjacent segments. The error in the sensed relative kinematic state is reduced if the surface area is made so as to extend in at least one of: a direction of the relative movement of the target object and another direction in a plane substantially perpendicular to the direction of the relative movement. In other words, the surface of the interface of the specific segment has a profile that varies relative to a virtual plane substantially perpendicular to the relative direction of movement. If the interlocking interfaces are thus formed, the error in the sensed relative kinematic state can be reduced as a result of spatially distributing the influence of the seam on the magnetic field. The air gap is not concentrated at a single, specific position of the target object relative to the sensor, but is spread out along the direction of relative movement. The locally occurring error in the sensed relative kinematic state is a consequence of a difference between the vector of the actual magnetic field at the sensor and the intended magnetic field vector. The error increases with increasing air gap at the boundary between two segments, and decreases with the surface area of the segments at their air gap. For instance dove-tailing can increase the area with a factor large enough to allow a realistic air gap between adjacent segments in the range of 0.02-0.05 mm.

Optionally the interlocking establishes a link between adjacent ones of the segments through slight elastic deformation of the segments when manipulated to engage with one another.

Forming the target object by means of interlocking the plurality of segments enables the plurality of segments to be positioned accurately with respect to one another owing to the shape of their engaging interfaces. The concatenation of the plurality of interlocking segments can be installed more easily in its entirely in the apparatus than if the segments did not have interfaces for interlocking, and had to be welded to one another first, as in U.S. Pat. No. 6,051,969. Note that welding the segments will subject them to locally high temperatures. A high temperature may possibly lead to loss or reduction of magnetization if the segments have been magnetized before building the target object. A high temperature may possibly also lead to distortion of the segments' shapes.

A first advantage of using multiple segments is that it enables the designer of the system to use a modular approach to building a wide variety of different kinds of target objects. That is, target objects of different sizes and/or different shapes and/or different material capabilities to affect the magnetic field, can be made by means of different numbers of standardized, interlocking segments. Segments of a uniform shape and/or uniform physical constitution can be used to build differently sized or differently shaped target objects, depending on the spatial requirements of the intended application of the system. Alternatively, differently sized and/or differently shaped segments or segments of different material capabilities to affect the magnetic field, can be provided. This alternative enables to build any of even a larger collection of target objects, in order to even better tailor the eventual target object to the intended application of the system.

Preferably, the segments are made in a metal-injection molding (MIM) process. As known, MIM is a technology with a wide range of industrial applications to manufacture in a cost-effective way small metal parts of complex shapes in high volumes. Manufacturing a batch of large metal objects of a complex shape by means of any suitable technology may therefore be commercially far less attractive then using MIM for manufacturing a much larger batch of smaller metal parts and assembling a larger metal object from a number of the smaller parts.

A second advantage of building a target object with a small number of different types of segments, is that this approach enables to implement a so-called "De Bruijn sequence" for encoding the relative kinematic state. De Bruijn sequences are known in the field of combinatorial mathematics. A De Bruijn sequence is a particular sequence of consecutive characters chosen from an alphabet, e.g., the alphabet {A, B, C} or the alphabet {0,1}. The particular sequence has such a pattern of characters that each possible subsidiary sequence, having a pre-determined length shorter than that of the particular sequence and present within the particular sequence, occurs exactly once within the particular sequence. That is, a De Bruijn sequence is the shortest sequence, which comprises all possible permutations (from a given set) of a specific length exactly once. If each specific type of segment in the De Bruijn sequence generates a specific sensor signal, then the relative kinematic state of the first physical object and the second physical object is determined by the contents of a first-in-first-out (FIFO) buffer that buffers the most recently generated sensor signals during the relative movement.

The interlocking segments may form a rigid concatenation that is attached, e.g., through welding or gluing, to the second physical object. Alternatively, the interlocking segments may form a flexible concatenation. For example, the segments are configured for enabling adjacent ones of the interlocking segments to pivot around one or two common axes that are oriented perpendicularly to a trajectory of the relative movement of the first physical component and the second physical component.

For example, a specific one of the segments may be used as a calibration segment, e.g., to indicate a reference state (such as a reference position or reference rotation angle) in the concatenation of interlocking segments. The calibration segment is then configured for temporarily adopting a specific calibration pattern, e.g., a specific magnetization pattern or a specific spatial profile at a surface of the calibration segment facing the sensor. For example, the calibration segment has a first surface facing the sensor in operational use, and a second surface at the opposite side of the segment. The first surface and the second surface have different capabilities with regard to affecting the magnetic field at the sensor when the calibration segment is passing the sensor. The first surface and the second surface have different magnetization patterns and/or different spatial profiles. By means of pivoting or flipping the calibration segment while forming part of the concatenation of interlocking segments, the second surface is made to face the sensor instead of the first surface. This enables a calibration or a reset position function without having to make different components: one type for calibration and another type for operational use. Alternatively, the calibration segment itself is of a modular configuration. The calibration segment has a base portion and a top portion. The base portion is configured for interlocking with the adjacent segments, and the top portion is configured for affecting the magnetic field at the sensor, as described above. The top portion is removably attached (e.g., locked or glued) to the base portion. The top portion can be temporarily replaced with a particular top portion configured for the calibration.

In an embodiment of the apparatus, the plurality of segments comprises a first segment and a second segment. The first segment has a first interface and the second segment has a second interface. The first interface and the second interface are configured for interlocking the first segment and the second segment. A first shape of the first interface and a second shape of the second interface are formed spatially complementarily. The first shape of the first interface extends in a first direction of the relative movement of the first physical component and the second physical component. The first shape has a first profile that varies in a second direction that is substantially perpendicular to the first direction, and the second shape of the second interface extends in the first direction and has a second profile that varies in the second direction. For example, each of the first profile and the second profile varies linearly with distance in the second direction. The first profile and the second profile may also vary in a third direction perpendicular to the first direction and the second direction.

In a further embodiment of the apparatus of the invention, the magnet is mounted stationary with respect to the sensor. Each respective one of the plurality of interlocking segments comprises respective guiding means for guiding a flux of the magnetic field. The guiding means is operative to affect the attribute in dependence on the relative kinematic state.

For example, the guiding means comprises a material with a high permeability, e.g., a ferromagnetic material. As known, a material with high permeability acts as if it were a guide to the flux of the magnetic field. If a material with high permeability is positioned close to the magnet, the presence of the material with high permeability changes the course of the field lines of the magnetic field with respect to the course of the field lines of the magnetic field in the absence of the material with high permeability. The changes in the magnetic field, brought about by the presence of the material with high permeability, depend on the shape and volume of the material with high permeability, on a quantity that is representative of the distance between the magnet and the guiding means, e.g., the distance between the magnet and that part of the guiding means that is closest to the magnet, and, on a spatial orientation of the guiding means relative to the magnet.

To illustrate the above, in an embodiment of the apparatus, the respective guiding means is formed as a respective top surface of the respective segment facing the first physical component. The respective top surface has a respective profile that varies over the respective segment along a direction of the moving. When the first physical object and the second physical object are moving relative to each other, the varying profile of a specific segment, close to the sensor, has a varying influence on the magnetic field at the location of the sensor. The variation in the magnetic field at the sensor gives information about the relative movement.

As a further illustration, in a further embodiment of the apparatus, the respective profile has a respective first track and a respective second track running parallel to each another in the direction of the moving. The first track comprises a first sequence of first elevations and first recesses that are alternating in the direction of the moving. The second track comprises a second sequence of second elevations and second recesses that are alternating in the direction of the moving. The presence of two or more parallel tracks enables to more accurately determine the relative kinematic state and/or to determine a direction of the relative movement.

In another embodiment of the apparatus, each respective one of the plurality of interlocking segments comprises a respective top surface facing the first physical object. The magnet comprises a layer with magnetic particles. The layer is accommodated on the respective top surface. The layer is configured to create the magnetic field that varies along the respective segment in the direction of the moving. For example, each respective top surface is profiled with elevations alternating with recesses in the direction of the relative movement. The layer is covers the elevations only, and leaves the recesses uncovered. As another example, the layer covers the recesses and the elevations. As yet another example, the respective top surface is flat and the layer is configured as a Halbach array.

In a further embodiment, the plurality of the interlocking segments are shaped uniformly. As mentioned earlier, the modular architecture of the target object has multiple advantages, especially if the segments are all alike.

In a further embodiment, the first physical object comprises an outer ring of a rolling element bearing. The second physical object comprises an inner ring of the rolling elements bearing. The rolling element bearing comprises a plurality of rolling elements accommodated between the inner ring and the outer ring. The target object is shaped as a further ring that is mounted at the rolling element bearing and coaxially with one of the inner ring and the outer ring.

The invention as described above is exploited as an apparatus or a machine. The invention can also be exploited as a system for use in the apparatus of the invention, as a sensor arrangement for use in the apparatus of the invention, as a target object for use in the apparatus of the invention, or as a segment for use in the target object in the apparatus of the invention.

BRIEF DESCRIPTION OF THE DRAWINGS

The invention is explained in further detail, by way of example and with reference to the accompanying drawing, wherein.

Throughout the Figures, similar or corresponding features are indicated by same reference numerals.

DETAILED EMBODIMENTS

Figure 1:
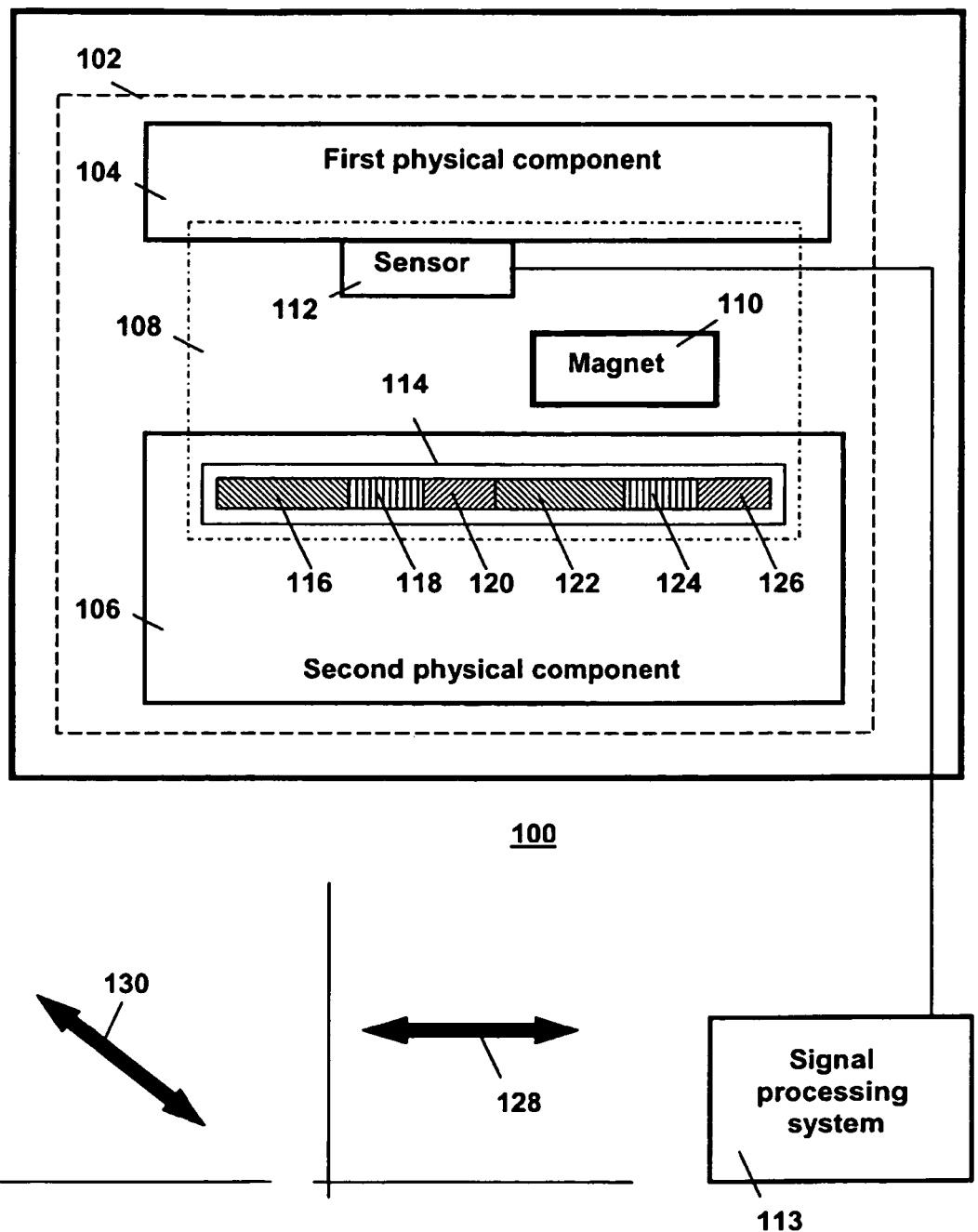
FIG. 1 is a block diagram of a first apparatus in the invention.

FIG. 1 is a block diagram of a first apparatus 100 in the invention. The first apparatus 100 is, e.g., a machine. The first apparatus 100 comprises a system 102 that has a first physical component 104, a second physical component 106 and a sensor arrangement 108. The first physical component 104 and the second physical component 106 are configured for moving relative to one another. The sensor arrangement 108 is configured for sensing a relative kinematic state of the first physical component 104 and the second physical component 106. The sensor arrangement 108 comprises a magnet 110 and a sensor 112. The sensor 112 is operative to generate a sensor signal indicative of a property of a magnetic field, generated by the magnet 110 and sensed at a location of the sensor 112. For example, the property sensed by the sensor 112 is an orientation of a magnetic field vector relative to the sensor 112 and/or the strength of the magnetic field vector, or the strength of a specific component of the magnetic field vector. The sensor signal from the sensor 112 is supplied to a signal processing system 113. The signal processing system 113 is accommodated at the first apparatus 100, or resides at a remote location. The signal processing system 113 is operative to process the sensor signal received from the sensor 112. The processing of the sensor signal is for the purpose of, e.g., maintaining a history log of events concerning the relative kinematic state of the first physical component 104 and the second physical component 106, as in e.g., condition monitoring, and/or is for the purpose of controlling operation of the first apparatus 100 in dependence on the sensor signal. A communication between the sensor 112 and the signal processing system 113 uses a wired or a wireless connection or a combination thereof.

The sensor 112 comprises, for example, one or more Hall-effect sensor devices, one or more sensor devices, whose operation is based on magneto-resistance (MR) or giant magneto-resistance (GMR), or one or more coil sensor devices. If the sensor 112 is implemented using multiple coil sensor devices, the coils may be accommodated in a yoke designed to allow encoding of the relative displacement of the first physical component 104 and the second physical component 106 even when there is interference from external magnetic fields. Coil-based yokes are well known in rotational-variable differential transformers (RVDTs). An RVDT detects the location of an object on the basis of the differences in coil induction. This yoke can be made from a laminated structure, e.g., elements that are pressure molded or elements that are made from deep-drawn sheet material.

In the example of FIG. 1, the magnet 110 and the sensor 112 are mounted stationary with respect to the first physical component 104. The magnet 110 is mounted near, or at, the sensor 112. The sensor arrangement 108 further comprises a target object 114. The target object 114 is mounted stationary with respect to the second physical component 106. Accordingly, when the first physical component 104 and the second physical component 106 are moving relative to one another, the sensor 112 and the target object 114 are moving relative to one another as well, and in the same way as the first physical component 104 and the second physical component 106 are. The target object 114 is configured for affecting an attribute of the property of the magnetic field as sensed by the sensor 112, in dependence on the relative kinematic state. The attribute is indicative of, e.g., the presence or absence of the property of the magnetic field, a magnitude of the property of the magnetic field, etc., as discussed above. If the relative kinematic state of the first physical component 104 and of the second physical component 106 changes, the attribute of the property of the magnetic field at the location of the sensor 112 changes accordingly. As a result, the sensor 112 supplies a sensor signal that is representative of the change in the property, or of the changing property. The sensor signal from the sensor 112 is then representative of the relative kinematic state of the first physical component 104 and the second physical component 106.

For completeness it is remarked that the sensor arrangement 108 may comprise further sensors (not shown), in addition to the sensor 112, and/or that the sensor arrangement 108 may comprise further magnets, in addition to the magnet 110. In case of using multiple sensors and magnets, it may be advantageous to have some of the sensors and magnets mounted stationary with respect to the first physical component 104 and other sensors and magnets mounted stationary with respect to the second physical component 106.

The target object 114 comprises a plurality of interlocking segments, such as a first segment 116, a second segment 118, a third segment 120, a fourth segment 122, a fifth segment 124 and a sixth segment 126. The mechanical interlocking is implemented by, for example, a snap-fitting that requires an elastic deformation of the parts of neighboring ones of the segments 116-126 for engaging the neighboring ones of the segments 116-126. Alternatively, or in addition, each pair of adjacent ones of the interlocking segments 116, 118, 120, 122, 124 and 126 have spatially complementarily shaped interfaces for engaging with one another.

Advantages of having the target object 114 made with the plurality of segments 116-126, preferably interlocking, have been discussed above.

The plurality of the interlocking segments 116-126 together are configured to form guiding means for guiding the flux of the magnetic field. The guiding of the flux depends on the relative kinematic state of the first physical component 104 and the second physical component 106. A technical advantage of interlocking is that the interlocking facilitates a seamless transition of flux between segments. Some air gap will remain, which leads to a reduction in permeability of the target object 114, but this loss can be reduced by increasing the area of the interlock.

Different ones of the plurality of the interlocking segments 116-126 may have different shapes and/or different distribution of material characteristics relevant to affecting the field lines of the magnetic field of the magnet 110 in dependence on the relative kinematic state of the first physical object 104 and the second physical object 106. An example of the shape, relevant to affecting the field lines of the magnetic field, is the profile and/or extent of the surface of each of the plurality of the interlocking segments 116-126 that faces the sensor 112.

Examples of a material characteristic are magnetic permeability of the material used to implement one or more of the segments 116-126, a chemical constitution of the one or more of the segments 116-126, a density of the material used to implement one or more of the segments 116-126, etc. For example, each of the interlocking segments 116-126 is made from a passive magnetic material such as ferrite steel (AISI 430).

For example, each of the interlocking segments 116-126 is made of a same material with a high magnetic permeability so as to constitute a guide to the magnetic flux. That is, each of the interlocking segments 116-126 serves to attract the magnetic field lines. If the shapes of the plurality of the interlocking segments 116-126 are different, and the material characteristic are the same for all of the interlocking segments 116-126, the target object 114 as a whole affects the magnetic field as sensed by the sensor 112 in a way that is different per relative position of the first physical object 104 and the second physical object 106. Assume, for example, that the second physical component 106 is configured for moving relative to the first physical component 104 along a pre-determined path that is parallel to a direction of the concatenation formed by the plurality of the interlocking segments 116-122, as indicated with an arrow 128. For example, the path is a part of a straight line oriented along the direction of the arrow 128, and the concatenation of the plurality of interlocking segments 116-126 is aligned with this straight line. Alternatively, the path is at least part of a circle, and the concatenation of the plurality of interlocking segments 116-126 forms at least a part of a ring. The arrow 128 then indicates the direction of movement tangent to the path. Accordingly, the relative position and the direction of relative motion of the first physical object 104 and the second physical object 106 are encoded in the way, wherein the magnetic field at the sensor 112 is affected.

In above example, each of the plurality of the interlocking segments 116-126 may have a shape different from any other of the interlocking segments 116-126. Alternatively, some of the plurality of the interlocking segments 116-126 may have a first shape, and others of the plurality of the interlocking segments 116-126 may have a second shape different from the first shape. The relative kinematic state of the first physical component 104 and the second physical component 106 can then be encoded using a De Bruijn sequence, as specified earlier.

As another example, the plurality of the interlocking segments 116-126 have uniform shapes and uniform material characteristics regarding the ability to affect a local magnetic field. Assume, for example, that the second physical component 106 is configured for moving relative to the first physical component 104 along a pre-determined path that is oblique with respect to the concatenation formed by the plurality of the interlocking segments 116-122, as indicated with an arrow 130. That is, the minimum distance between the first physical component 104 and the second physical component 106 varies in dependence on a relative position of the first physical component 104 and the second physical component 106. Now, the relative position of the first physical component 104 and the second physical component 106 can be characterized by, e.g., the shortest distance between the target object 114 and the magnet 110. The magnetic field as sensed by the sensor 112 will be affected more strongly if the target object 114 is closer to the magnet 110 than if the target object 114 is more remote from the magnet 110. Again, the relative position and the direction of relative motion of the first physical object 104 and the second physical object 106 are encoded in the way, wherein the magnetic field at the sensor 112 is affected.

As yet another example, the plurality of the interlocking segments 116-126 have uniform shape and uniform material characteristics regarding the ability to affect the magnetic field. Assume that the second physical component 106 is configured for moving relative to the first physical component 104 along a pre-determined path that is parallel to a direction of the concatenation formed by the plurality of the interlocking segments 116-122, as indicated with the arrow 128. Examples of such a pre-determined path include a part of a straight line and a part of a circle, as discussed above. Assume further that the plurality of the interlocking segments 116-126 form a concatenation parallel to the pre-determined path, and that each of the plurality of the interlocking segments 116-126 has a surface facing the first physical component 104 and profiled in a direction parallel to the pre-determined path. For example, the profiled surface is characterized by recesses and elevations occurring alternately in the direction of the pre-determined path. Accordingly, when the second physical component 106 is moving relative to the first physical component 104 along the pre-determined path, the magnetic field is affected in a repeated fashion as any of the plurality of the interlocking uniform segments 116-126 first approaches the magnet 110, passes by, and then recedes. In this example, the sensor signal from the sensor 112 can be used to determine a magnitude of the speed with which the first physical component 104 and the second physical component 106 move with respect to one another, as the speed is associated with the rate of changes in the magnetic field sensed by the sensor 112. Consider now that each of the plurality of the interlocking, uniform segments 116-126 has a surface facing the first physical component 104 and having a specific profile in the direction parallel to the pre-determined path. If the specific profile has a mirror-symmetry, a direction of the relative movement of the first physical component 104 and the second physical component 106 cannot readily be determined without further measures. A reason for this is that the changes in the magnetic field, as sensed by the sensor 112 during the relative movement, do not allow discriminating between moving in one direction and moving in the opposite direction. If the profile does not have a mirror-symmetry, it is in principle possible to derive, from the changes in the magnetic field as sensed by the sensor 112, information about the direction of movement. A relative position assumed by the first physical component 104 and the second physical component 106, when the movement has stopped, cannot readily be determined, regardless of the profile, without further measures, such as counting the number of cyclically occurring changes in the sensor signal relative to a reference position of the first physical component 104 and the second physical component 106 relative to one another. However, information on the direction and/or relative position speed is not needed in certain fields of application.

As still another example, the plurality of the interlocking segments 116-126 have uniform shape and different material characteristics regarding the ability to affect the magnetic field. Again, the relative kinematic state of the first physical component 104 and the second physical component 106 can be derived from the sensor signal supplied by the sensor 112: different material characteristics per different ones of the interlocking segments 116-126 enable to affect the magnetic field at the sensor 112 in a way that identifies the relevant ones of the interlocking segments contributing to the sensed change in the magnetic field, and that therefore identifies the relative kinematic state.

Figure 2:
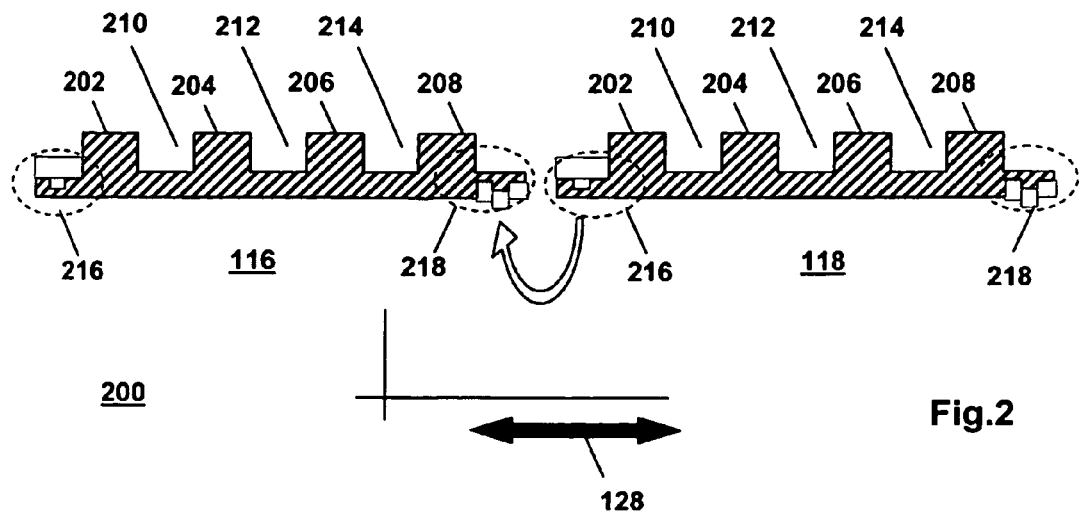
FIGS. 2 and 3 illustrate a first example and a second example, respectively, of a pair of segments for the target object in the sensor arrangement.

FIG. 2 illustrates a first example of a cross-section through a pair of the segments 116-122, e.g., the first segment 116 and the second segment 118 in a first embodiment 200 of the target object 114. The first segment 116 and the second segment 118 are uniformly shaped and have profiled surfaces. The cross-section is taken in a plane parallel to the direction of relative movement 128. The surface of each of the first segment 116 and the second segment 118 is profiled as an alternating sequence of elevations and recesses. Each of the first segment 116 and the second segment 118 has a first elevation 202, a second elevation 204, a third elevation 206 and a fourth elevation 208. Each of the first segment 116 and the second segment 118 has a first recess 210 between the first elevation 202 and the second elevation 204, a second recess 212 between the second elevation 204 and the third elevation 206, and a third recess 214 between the third elevation 206 and the fourth elevation 208.

Each of the first elevation 202, the second elevation 204, the third elevation 206 and the fourth elevation 208 has a respective plane of mirror-symmetry, perpendicular to the direction of relative movement 128. Each of the first recess 210, the second recess 212 and the third recess 214 has a respective further plane of symmetry, perpendicular to the direction of relative movement 128.

Each of the first segment 116 and the second segment 118 has a first interface 216 adjacent the first elevation 202 and a second interface 218 adjacent the fourth elevation 208. The first interface 216 and the second interface 218 are spatially complementarily shaped. As a result, the first interface 216 of the second segment 118 is configured for engaging with the second interface 218 of the first segment 116. Upon having engaged, a further recess is formed between the fourth elevation 208 of the first segment 116 and the first elevation 202 of the second segment 118. The further recess has the same shape and the same dimensions as any of the first recess 210; the second recess 212 and the third recess 214.

When the first segment 116 and the second segment 118 are moving relative to the magnet 110, the alternating sequence of recesses and elevations causes an alternating change in the sensor signal from the sensor 112. Owing to the symmetrical profile of the first elevation 202, the second elevation 204, the third elevation 206, the fourth elevation 208, the first recess 210, the second recess 212, the third recess 214 and the further recess, the sensor 112 cannot discriminate between opposite directions of relative movement of the first physical component 104 and the second physical component 108.

Figure 3:
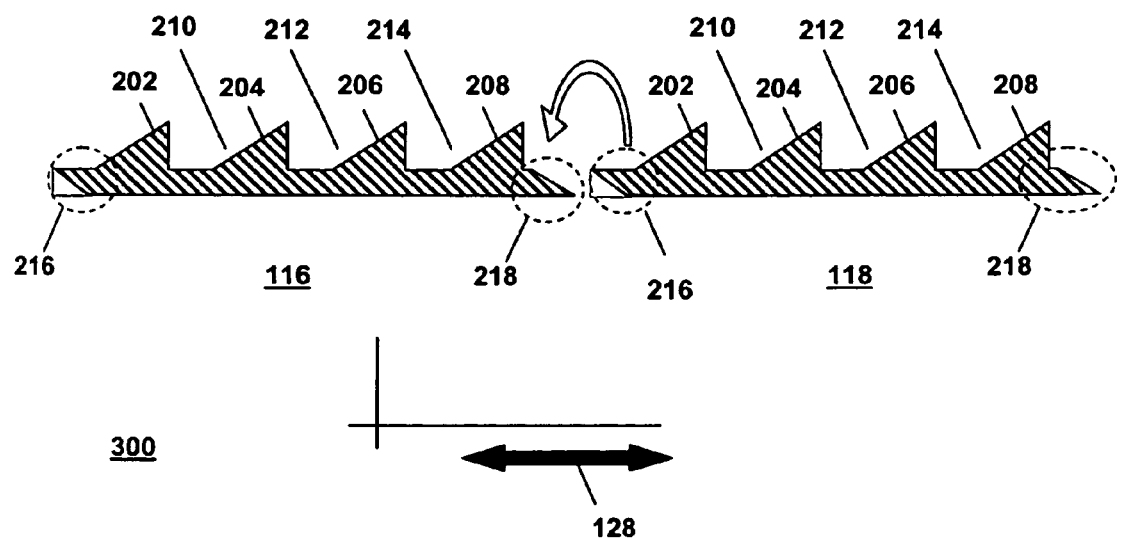

FIG. 3 illustrates a second example of a cross-section through a pair of the segments 116-122, e.g., the first segment 116 and the second segment 118, in a second embodiment 300 of the target object 114. Again, the first segment 116 and the second segment 118 are uniformly shaped and have profiled surfaces. The cross-section is taken in the plane parallel to the direction of relative movement 128. The surface of each of the first segment 116 and the second segment 118 is profiled as an alternating sequence of elevations and recesses. Each of the first segment 116 and the second segment 118 has a first elevation 202, a second elevation 204, a third elevation 206 and a fourth elevation 208. Each of the first segment 116 and the second segment 118 has a first recess 210 between the first elevation 202 and the second elevation 204, a second recess 212 between the second elevation 204 and the third elevation 206, and a third recess 214 between the third elevation 206 and the fourth elevation 208.

Each of the first segment 116 and the second segment 118 has a first interface 216 adjacent the first elevation 202 and a second interface 218 adjacent the fourth elevation 208. The first interface 216 and the second interface 218 are spatially complementarily shaped. As a result, the first interface 216 of the second segment 118 is configured for engaging with the second interface 218 of the first segment 116. Upon having engaged, a further recess is formed between the fourth elevation 208 of the first segment 116 and the first elevation 202 of the second segment 118. The further recess has the same shape and the same dimensions as any of the first recess 210, the second recess 212 and the third recess 214.

In the second embodiment 300, none of the first elevation 202, the second elevation 204, the third elevation 206, the fourth elevation 208, the first recess 210, the second recess 212, the third recess 214 and the further recess has a plane of mirror-symmetry perpendicular to the direction of relative movement 128. When the first segment 116 and the second segment 118 are moving relative to the magnet 110, the alternating sequence of recesses and elevations causes an alternating change in the sensor signal from the sensor 112. Owing to the asymmetrical profile of the first elevation 202, the second elevation 204, the third elevation 206, the fourth elevation 208, the first recess 210, the second recess 212, the third recess 214 and the further recess, the sensor signal from the sensor 112 discriminates between opposite directions of relative movement of the first physical component 104 and the second physical component 108.

Figure 4:
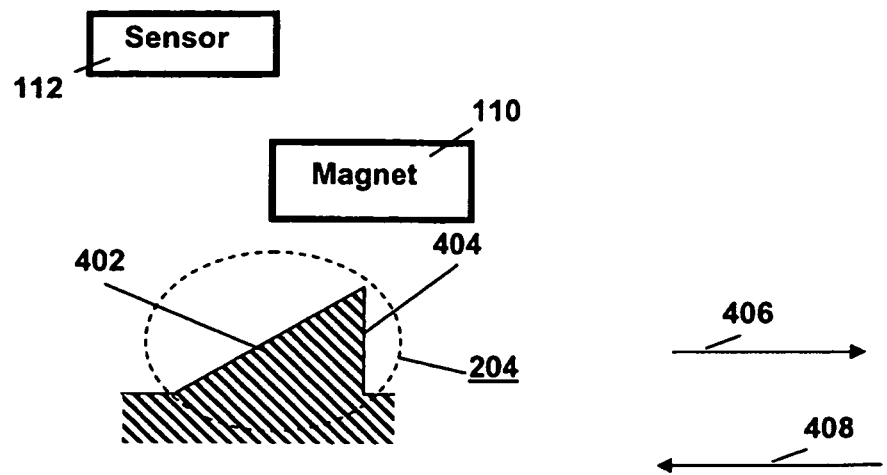
FIG. 4 is a diagram illustrating some details of the second example in FIG. 3.

Reference is now had to FIG. 4 with a diagram of part of the example of the second embodiment 300 shown in FIG. 3. The diagram of FIG. 4 shows the second elevation 204. As the first elevation 202, the second elevation 204, the third elevation 206 and the fourth elevation 208 have uniform shapes, the following also applies to the first elevation 202, the third elevation 206 and the fourth elevation 208. As shown in FIG. 4, the second elevation 204 has a left flank 402 and a right flank 404. The left flank 402 has a more gradual slope than the right flank 404.

Consider now a relative movement of the first physical component 104 and the second physical component 106 at a uniform speed, wherein the second elevation 204 moves, relative to the magnet 110, in the direction of a first arrow 406, i.e., to the right. The second elevation 404 approaches the magnet 110 from the left, passes the magnet 110, and recedes to the right. When the second elevation 204 starts to affect the magnetic field at the location of the sensor 112, the influence on the magnetic field as sensed by the sensor 112 is rather abruptly increasing, owing to the steepness of the right flank 404. When the second elevation 204 is passing by the magnet 110, the resulting change in the magnetic field at the sensor 112 is gradual and decreasing, owing to the gradual slope of the left flank 402.

Consider now a relative movement of the first physical component 104 and the second physical component 106 at a uniform speed, wherein the second elevation 204 moves, relative to the magnet 110, in the direction of a second arrow 408, i.e., to the left. The second elevation 404 approaches the magnet 110 from the right, passes the magnet 110, and recedes to the left. When the second elevation 204 starts to affect the magnetic field at the location of the sensor 112, the influence on the magnetic field as sensed by the sensor 112 is gradually increasing, owing to the gradual slope the right flank 404. When the second elevation 204 is passing by the magnet 110, the resulting change in the magnetic field at the sensor 112 is then abruptly decreasing, owing to the steep slope of the right flank 404.

A relative movement in the direction of the first arrow 406 gives rise to a periodic sensor signal from the sensor 112 with abruptly increasing influences on the magnetic field at the sensor 112. A relative movement in the direction of the second arrow 408 gives rise to a periodic sensor signal from the sensor 112 with abruptly decreasing influences on the magnetic field at the sensor 112. The occurrence of the abruptly increasing influence implies that the movement of the second elevation 204 is in the direction of the first arrow 406, i.e., to the right, whereas the occurrence of the abruptly decreasing influence implies that the second elevation 204 is moving in the direction of the second arrow 408, i.e., to the left. Accordingly, a surface of any of the segments 116-126 that lacks mirror-symmetry enables to discriminate opposite directions of relative movement of the first physical component 104 and the second physical component 106.

Operation of the embodiments discussed with reference to FIGS. 1, 2, 3 and 4 have been explained in a scenario, wherein each of the plurality of interlocking segments 116-126 of the target object 114 form a single track of varying shapes and/or varying material characteristics along the path of relative movement of the first physical object 104 and the second physical object 106, so as to affect the magnetic field at the location of the sensor 112 in dependence on the relative kinematic state of the first physical object 104 and the second physical object 106. Instead of a single track, multiple parallel tracks of varying shapes and/or varying material characteristics can be used.

Figure 5:
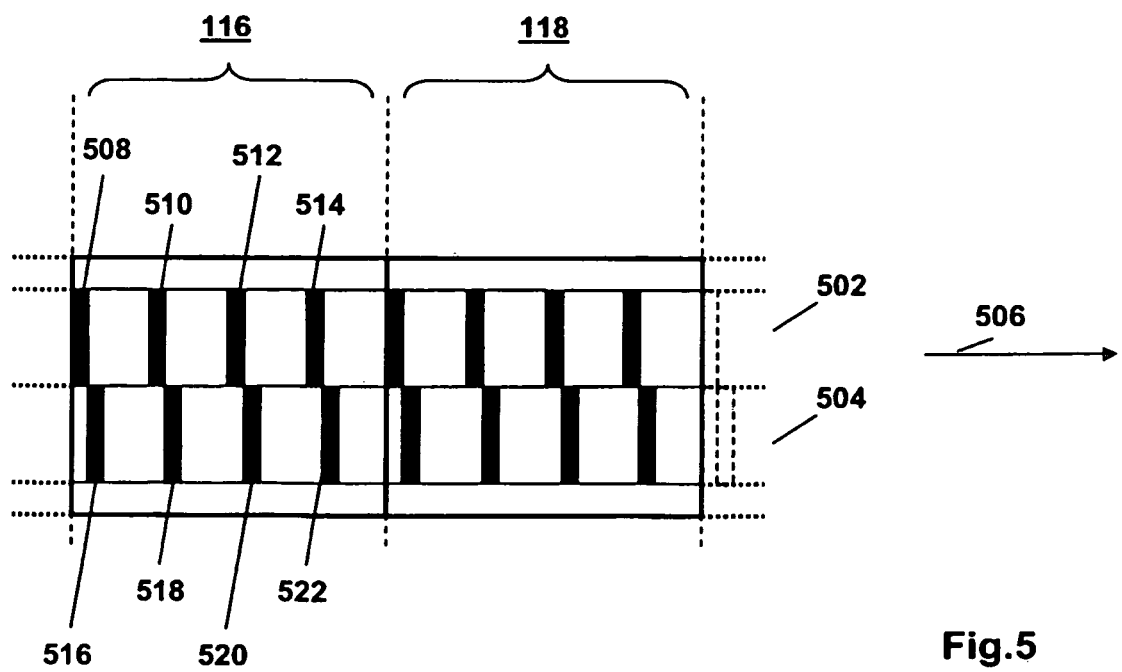
FIGS. 5 and 6 are diagrams of examples of a pair of segments that each have a profiled surface with double tracks to affect the magnetic field.

Reference is now had to FIG. 5 of a diagram showing the upper surfaces of the first segment 116 and the second segment 118, engaged with one another to form part of the target object 114. The upper surfaces face the sensor 112 in operational use of the target object 114. The first segment 116 and the second segment 118 have been drawn as respective rectangles that together define a straight path parallel to the direction of relative movement of the first physical component 104 and the second physical component 106. The rectangular shape is only given by way of example. Each of the first segment 116 and the second segment 118 might have been shaped as respective uniform pieces of a ring to define a curved path parallel to the direction of relative movement of the first physical component 104 and the second physical component 106.

Each of the first segment 116 and the second segment 118 comprises parts of a first track 502 and of a second track 504 that run in parallel in a direction 506 of relative movement of the first physical object 104 and the second physical object 106. The surface of each of the first track 502 and the second track 504 faces the sensor 112 and has a profile that varies in the direction 506 of the relative movement. Multiple parallel tracks per segment can be used for a variety of reasons.

A first reason is the following. Assume that each of the parallel tracks has a number of N elevations uniformly distributed across each individual segment, and that the segments are uniformly shaped. For example, the first track 502 of the first segment 116 has a first elevation 508, a second elevation 510, a third elevation 512 and a fourth elevation 514; and the second track 504 of the first segment 116 has a fifth elevation 516, a sixth elevation 518, a seventh elevation 520 and an eighth elevation 522. The fifth elevation 516 precedes the first elevation 508 by a specific offset in the direction 506 of relative movement. The sixth elevation 518 precedes the second elevation 510 by the specific offset. The seventh elevation 520 precedes the third elevation 512 by the specific offset. The eighth elevation 522 precedes the fourth elevation 514 by the specific offset. The specific distance is different from half the distance between two adjacent ones of the first elevation 508, the second elevation 510, the third elevation 512 and the fourth elevation 514. Accordingly, the magnetic field at the sensor 112 will first be affected by the eighth elevation in the second track 504 and then by the fourth elevation 514 in the first track when the relative movement of the first physical component 104 and the second physical component 106 occurs in the direction 506. If the relative movement takes place in the direction opposite to the direction 506, the magnetic field at the sensor 112 will first be affected by the fourth elevation 514 in the first track and then by the eighth elevation in the second track 504. As a result, the configuration enables to determine the direction of the relative movement of the first physical component 104 and the second physical component 106.

A second reason for using multiple tracks is explained with reference to the diagram of FIG. 6. Assume that the target object 114 is formed from the interlocking segments 116-126, and that each of the interlocking segments 116-126 carries a first track 502 and a second track 504 running in parallel to the direction 506 of relative movement. Consider a sequence of the first segment 116 and the second segment 118. Assume further that the first track 502 covers a number of M elevations uniformly distributed across the sequence of the first segment 116 and the second segment 118, and that the second track 504 covers a number of K elevations, uniformly distributed across the same sequence of the first segment 116 and the second segment 118, wherein M and K are different integers, for example, M=K+1. Assume also that the sensor 112 is configured for discriminating between a change in the magnetic field sensed as a result of an elevation in the first track 502 and as a result of another elevation in the second track 502. Finally, assume that the sensor 112 supplies an output signal that can be represented as a logic high (a logic "1") or as a logic low (a logic "0"), and that the passing of an elevation underneath the sensor 112 is associated with the logic high (logic "1"), and that the passing of a recess is associated with the logic low (logic "0"). Accordingly, when the sequence of the first segment 116 and the second segment 118 passes underneath the sensor 112, the first track 502 gives rise to a first series of logic highs and logic lows at the sensor 112 and the second track gives rise to a second series of logic highs and logic lows at the sensor 112. An individual logic high or an individual logic low in a single one of the first series and the second series does not allow determining which part of the sequence of the first segment 116 and second segment 118 passes underneath the sensor 112. However, the part can be identified on the basis of the combination of the logic high or the logic low of the first series occurring simultaneously with the logic high or logic low of the second series in conjunction with a preceding combination of the logic high or the logic low of the first series occurring simultaneously with the logic high or logic low of the second series. As specified earlier, the sensor 112 may be comprised of multiple sensor devices, e.g., a single one per individual track.

Figure 6:
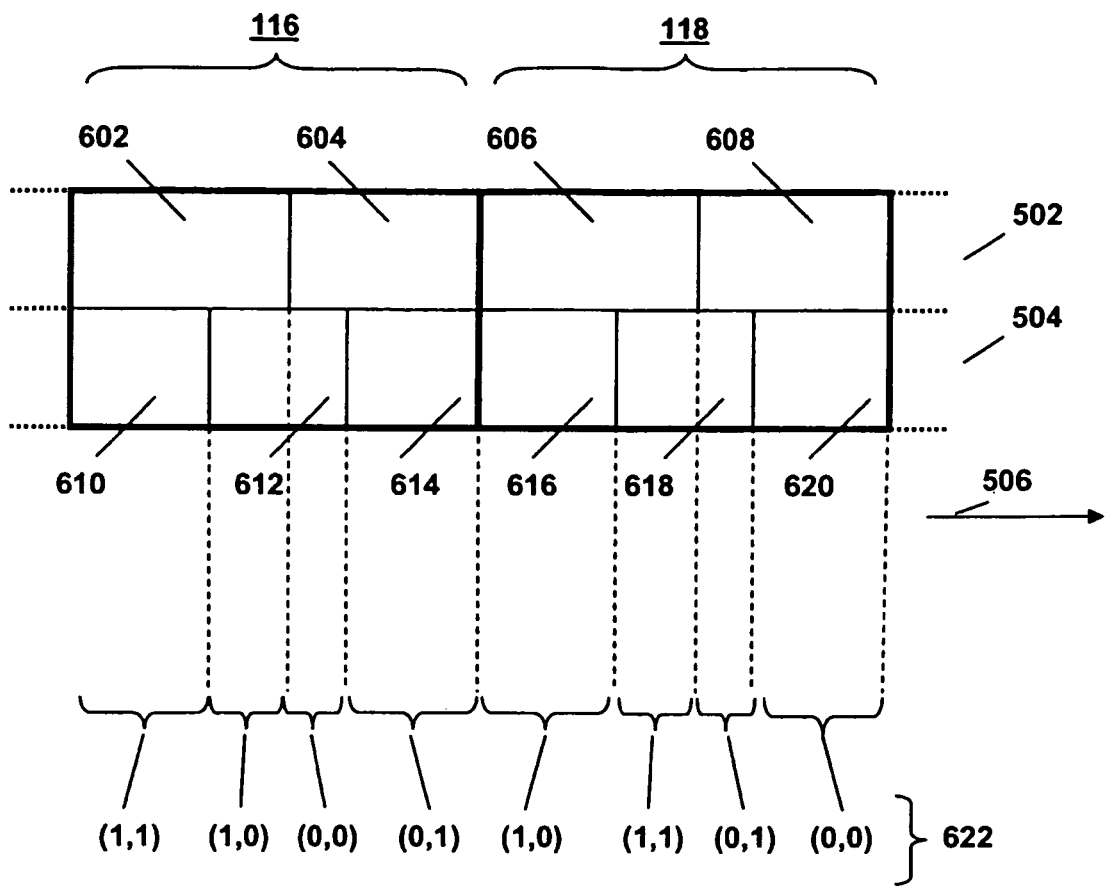
Figure 7:
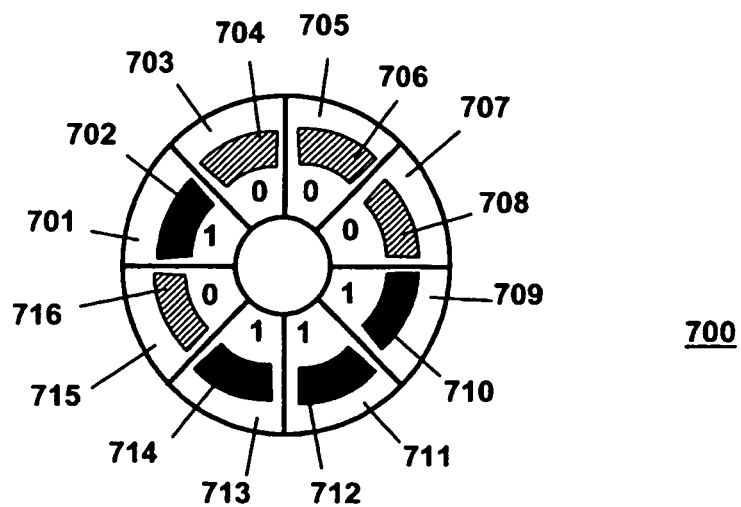
FIG. 7 is a diagram of a target object, whose concatenated segments form a De Bruijn sequence.

In the diagram of FIG. 6, the first track 502 has a first elevation 602, a first recess 604, a second elevation 606, and a second recess 608 uniformly distributed across the first segment 116 and the second segment 118 in a direction parallel to the direction 506 of relative movement of the first physical component 104 and the second physical component 106. In the diagram of FIG. 7, the second track 504 has a third elevation 610, a third recess 612, a fourth elevation 614, a fourth recess 616 and fifth elevation 618 and a fifth recess 620. When the first segment 116 and the second segment 118 move past the sensor 112 in the direction 506, the sensor 112 will produce a sensor signal that assumes the following values: (0,0); (0,1); (1,1); (1,0); (0,1); (0,0); (1,0) and (1,1), as indicated by reference numeral 622 in FIG. 6. Note that in this example, each specific ordered set of two logic values occurs twice during the passage of the first segment 116 and the second segment 118. However, also note that the first occurrence of a specific ordered set of two logic values has a different predecessor than the second occurrence of the same specific ordered set. For example, the sensor signal (0,1) generated by the second segment 118 is preceded by the sensor signal (0,0), and the sensor signal (0,1) generated by the first segment 116 is preceded by the sensor signal (1,0). Accordingly, by keeping track of the preceding sensor signal, the specific part can be determined of the first segment 116 and the second segment 118 that is passing underneath the sensor 112.

One could use three of more parallel tracks, each one thereof having different numbers of elevations, in order to more accurately determine the relevant part of the target object 114 passing underneath the sensor 112.

FIG. 7 illustrates yet another approach to encoding a relative position of the first physical component 104 and the second physical component 106. FIG. 7 is a diagram of a third embodiment 700 of the target object 114 being formed as a ring for angular encoding of the relative angular position the first physical component 104 and the second physical component 106. The first physical component 104 and the second physical component 106 are configured in this example for rotating around a common axis. The diagram of FIG. 7 shows a top surface of the target object 114 having a profiled surface that faces the sensor 112. The target object 114 is made from a plurality of interlocking segments: a first segment 701, a second segment 703, a third segment 705, a fourth segment 707, a fifth segment 709, a sixth segment 711, a seventh segment 713 and an eighth segment 715. The profiled surface comprises, in the order of appearance going around clockwise and starting at nine o'clock: a first elevation 702, a first recess 704, a second recess 706, a third recess 708, a second elevation 710, a third elevation 712, a fourth elevation 714 and a fourth recess 716. The first elevation 702, the second elevation 710, the third elevation 712, the fourth elevation 714, the first recess 704, the second recess 706, the third recess 708 and the fourth recess 716 are all defined with respect to a reference plane of the profiled surface. When any of the first elevation 702, the second elevation 710, the third elevation 712, and the fourth elevation 714 passes the sensor 112, the associated sensor signal is representative of a logic high (a logic "1"). When any of the first recess 704, the second recess 706, the third recess 708 and the fourth recess 716 passes the sensor 112, the associated sensor signal is representative of a logic low (a logic "0"). Accordingly, when the target object 114 rotates anti-clock-wise, starting with the first recess 704 passing the sensor 112, the sensor signal assume the following cyclic pattern: 0, 0, 0, 1, 1, 1, 0, 1. Assume now that the sensor signal is buffered for three consecutive values in a first-in-first-out (FIFO) buffer (not shown). The contents of the FIFO buffer then assumes the following cyclically repeating pattern: (0,0,0); (0,0,1); (0,1,1); (1,1,1); (1,1,0); (1,0,1) and (0,1,0). Note that each possible combination of three digits occurs only once during a complete tour around the circle. As a result of distributing the elevations and recesses, in the manner shown, among the first segment 701, the second segment 703, the third segment 705, the fourth segment 707, the fifth segment 709, the sixth segment 711, the seventh segment 713 and the eighth segment 715, the contents of the three-digit FIFO buffer uniquely identifies the relative angular position of the target object 114 with respect to the sensor 112, and therefore the relative kinematic state of the first physical component 104 and the second physical component 106. The distribution of the elevations and recesses illustrated in FIG. 7 is an example of a so-called De Bruijn sequence. By definition, a De Bruijn sequence of rank R on an alphabet of size S is a cyclic string wherein each of the number of $S^R$ words of length R in the string occurs exactly once. In the example of FIG. 7, the rank R=3 and the alphabet {0,1} has the size S=2. It can be proven that a De Bruijn sequence exist for all integer values of R and S.

Instead of using an encoding scheme based on a De Bruijn sequence, one could use, e.g., a single-track Gray code or a multi-track Gray Code. See, e.g., "Single-track Gray codes", Hiltgen, A. P.; Paterson, K. G.; Brandestini, M; IEEE Transactions on Information Theory, Vol. 42(5), September 1996, pages 1555-1561.

Figure 8:
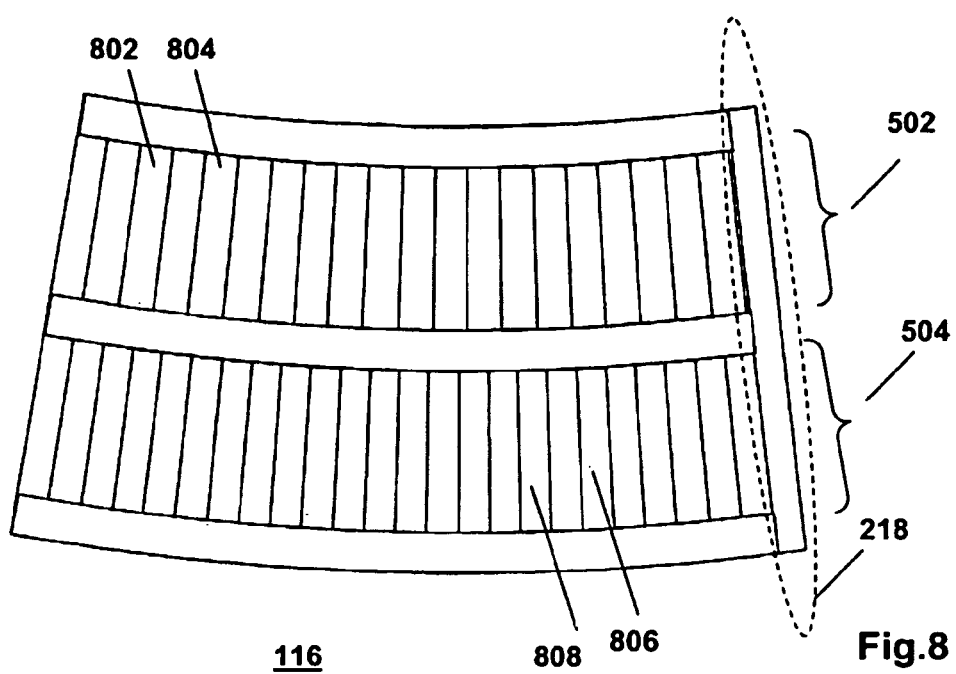
FIGS. 8 and 9 illustrate an example of an embodiment of a segment in the target object.
Figure 9:
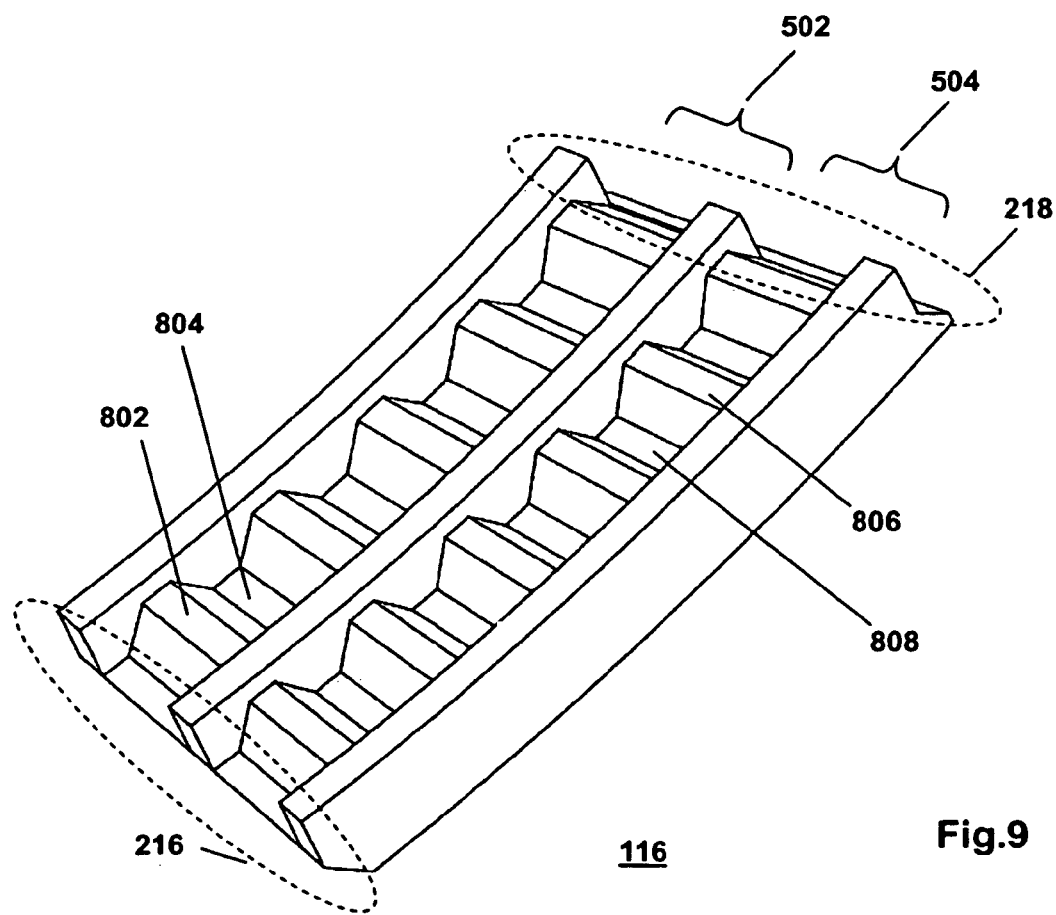

FIGS. 8 and 9 are diagrams illustrating an embodiment of the first segment 116 modeled after the example discussed with reference to FIG. 6. FIG. 8 is a diagram of the top surface of the first segment 116. FIG. 9 is a three-dimensional view of the first segment 116. The first segment 116 is shaped as a sector of a flat circular ring. The first segment 116 has a profiled surface with the first track 502 formed by a first alternating sequence of elevations and recesses, and with the second track 504 formed by second alternating sequence of elevations and recesses. In order to not obscure the drawing, only a single particular one of the elevations and a single particular one of the recesses are indicated with reference numerals per individual one of the first track 502 and the second track 504. A reference numeral 802 indicates the particular elevation in the first track 502. A reference numeral 804 indicates the particular recess in the first track 502. A reference numeral 806 indicates the particular elevation in the second track 504. A reference numeral 808 indicates the particular recess in the second track 504. Note that the left and right edges of the first segment 116 have been shaped so as to form the first interface 216 and the second interface 218, respectively, as discussed with reference to FIG. 2. Note also that the first segment 116 has five elevations in the first track 502, and six elevations in the second track 504. In the example shown, the first segment 116 spans a sector of 360°/22, so that a concatenation of twenty-two segments, all identical to the first segment 116, make up a full circle.

Figure 10:
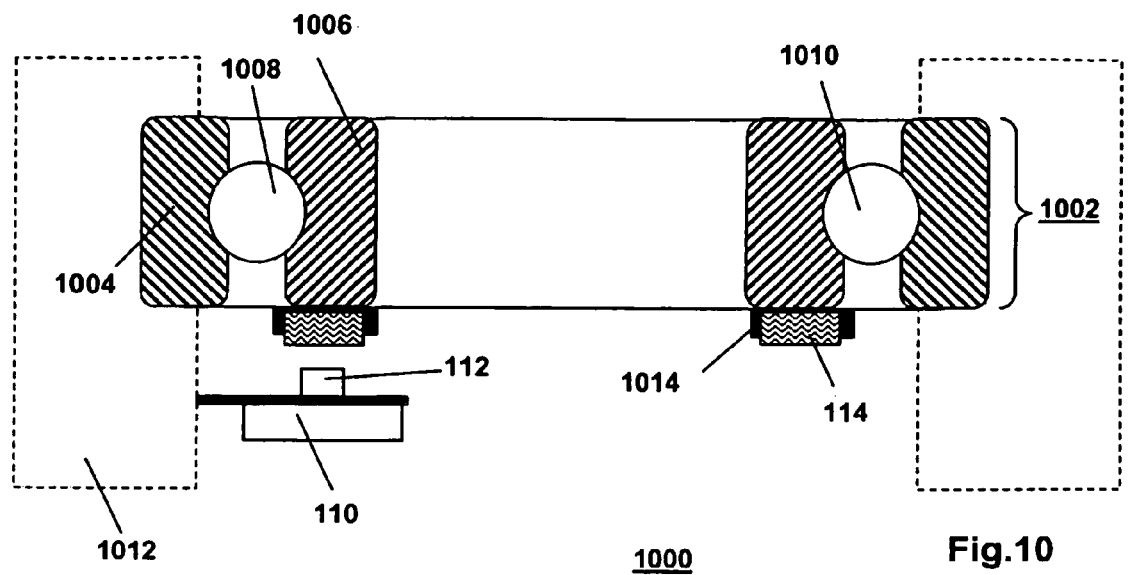
FIGS. 10, 11 and 12 are diagrams of an angular encoder integrated with a rolling element bearing.

FIG. 10 is a diagram of a cross-section through an angular encoder 1000 being used as an embodiment of the first apparatus 100. The angular encoder 1000 is physically integrated with a rolling element bearing 1002.

Figure 11:
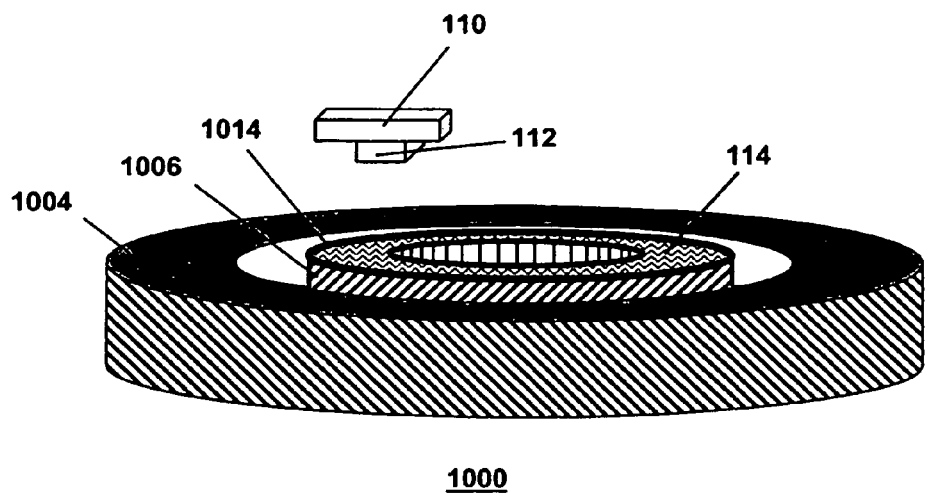

FIG. 11 is a diagram of a perspective view of the angular encoder 1000.

Figure 12:
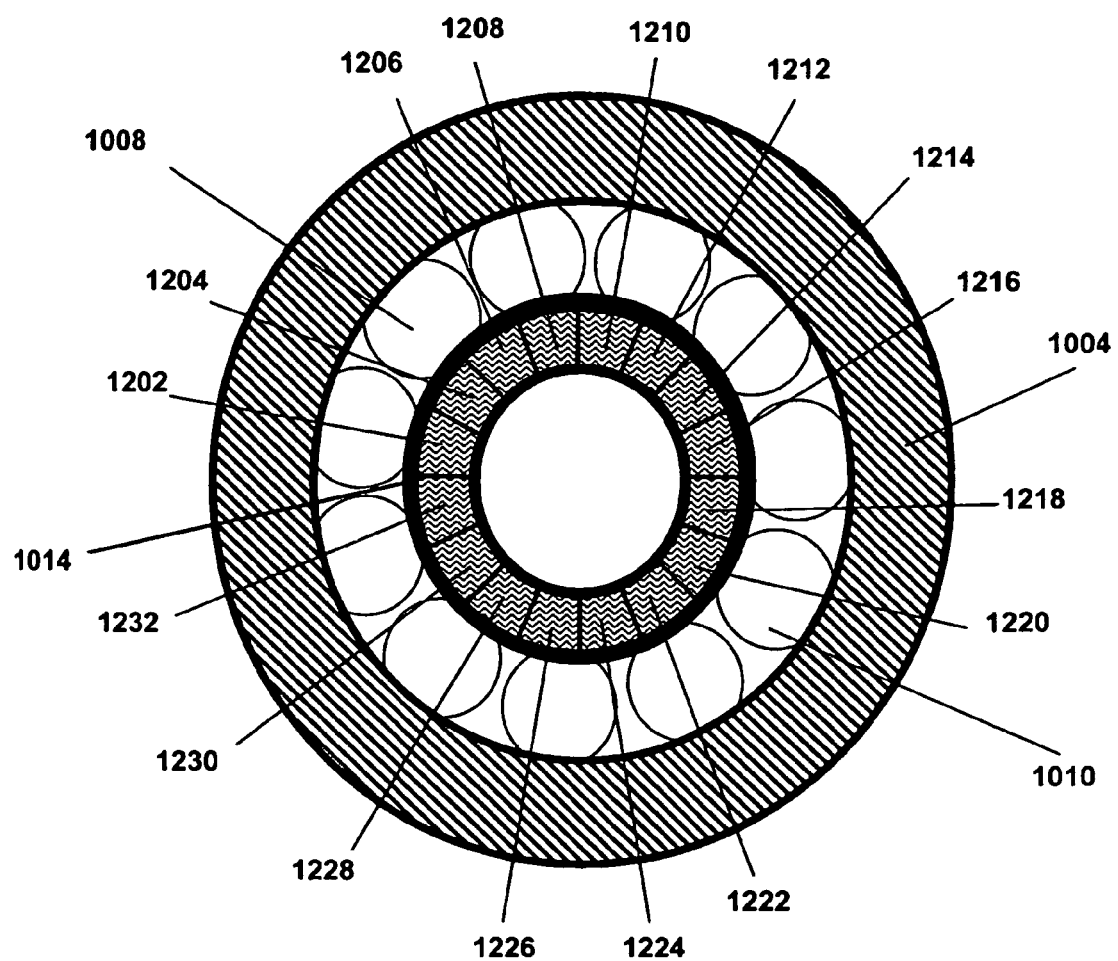

FIG. 12 is a diagram of a planar view of the angular encoder 1000.

The rolling element bearing 1002 comprises an outer ring 1004, an inner ring 1006, and a plurality of rolling elements arranged between the inner ring 1006 and the outer ring 1004. In order to not obscure the drawing, only a first rolling element 1008 and a second rolling element 1010 are indicated in FIG. 10. The outer ring 1004 is fixed with respect to a stationary housing 1012. The inner ring 1006 is free to rotate coaxially with respect to the outer ring 1004. The target object 114 is formed as a further ring that is mounted co-axially with, and stationary with respect to, the inner ring 1006. The outer ring 1004 plays the role of the first physical object 104 in FIG. 1, and the inner ring 1006 plays the role of the second physical object 106 of FIG. 1. The angular encoder 1000 is configured for encoding an angle of relative rotation of the inner ring 1006 with respect to the outer ring 1008.

The further ring of the target object 114 is made from a plurality of uniform, interlocking segments: a first ring-segment 1202, a second ring-segment 1204, a third ring-segment 1206, a fourth ring-segment 1208, a fifth ring-segment 1210, a sixth ring-segment 1212, a seventh ring-segment 1214, an eighth ring-segment 1216, a ninth ring-segment 1218, a tenth ring-segment 1220, an eleventh ring-segment 1222, a twelfth ring-segment 1224, a thirteenth ring-segment 1226, a fourteenth ring-segment, a fifteenth ring-segment 1230 and a sixteenth ring-segment 1232, explicitly indicated in the diagram of FIG. 12. Each of the plurality of the ring-segments 1202-1232 is implemented as discussed with reference to FIGS. 8 and 9 above.

The plurality of ring-segments 1202-1232 are made to interlock, e.g., through engaging a first interface of one of the ring-segments 1202 with a second interface of an adjacent one of the ring-segments 1202-1232. The first interface and the second interface have spatially complementary shapes, e.g., such as being used in a dovetail joint, for implementing a snap-fitting.

The plurality of interlocking ring-segments 1202-1232 may be attached directly to the side surface of the inner ring 1006, e.g., by gluing or laser spot-welding. Alternatively, in the example shown, the plurality of ring-segments 1202-1232 are supported by a sheet metal ring 1014 placed coaxially with, and attached to, the inner ring 1006. The sheet metal ring 1014 is located between the inner ring 1006 and the plurality of ring-segments 1202-1232 in operational use. For example, the sheet metal ring 1014 has an upper surface, which faces away from the inner ring 1006 and which forms a circular channel or groove that is shaped for accommodating the plurality of ring-segments 1202-1232. The plurality of ring-segments 1202-1232 are positioned in the circular channel. The plurality of ring-segments 1202-1232 may be spot-welded, clinched or glued to the sheet metal ring 1014. The sheet metal ring 1014 itself is then spot-welded, glued or otherwise attached to the inner ring 1006.

Figure 13:
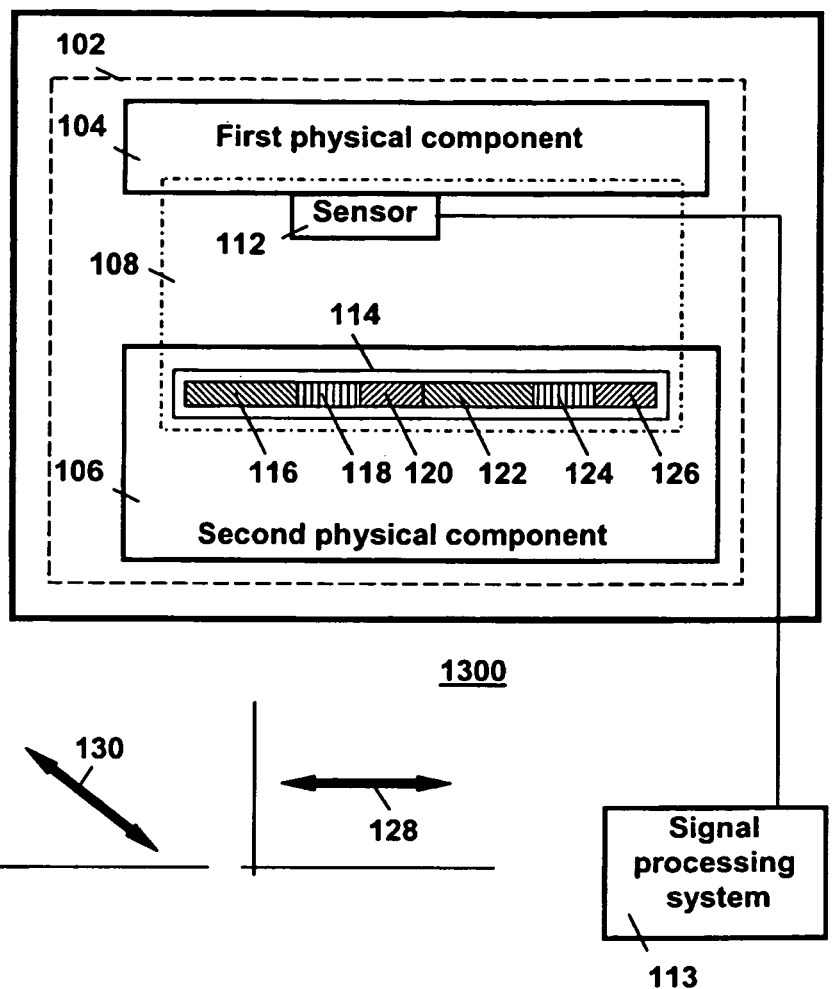
FIG. 13 is a diagram of a second apparatus in the invention.

FIG. 13 is a block diagram of a second apparatus 1300 in the invention. In the first apparatus 100 of FIG. 1, discussed earlier, the target object 114 comprises the plurality of the interlocking segments 116-126, that together are configured to form guiding means for guiding the flux of the magnetic field of the magnet 110 located external to the target object 114. The guiding of the flux depends on the relative kinematic state of the first physical component 104 and the second physical component 106. In the second apparatus 1300, the magnet 110 of the first apparatus 100 has functionally been integrated with the target object 114.

More specifically, each specific one of the plurality of interlocking segments 116-126 as discussed with reference to FIGS. 2, 3, 4, 5, 6, 7, 8 and 9, has a top surface that faces the sensor 112 when the specific segment is close to the sensor 112. The top surface is coated, partly or entirely, with a coating that contains magnetic particles. The coating comprises a mixture of magnetic particles and rubber (e.g., a variation on nitrile butylene rubber), or a mixture of magnetic particles with a plastic material, e.g., nylon.

For example, consider the profiled top surface, e.g., as shown in the first embodiment 200 in FIG. 2, or in the second embodiment 300 in FIG. 3, or in the third embodiment 700 in FIG. 7, or in the double track configuration per segment as shown in FIGS. 8 and 9. The coating is applied across the entire top surface or only to the elevations of the profiled top surface.

Figure 14:
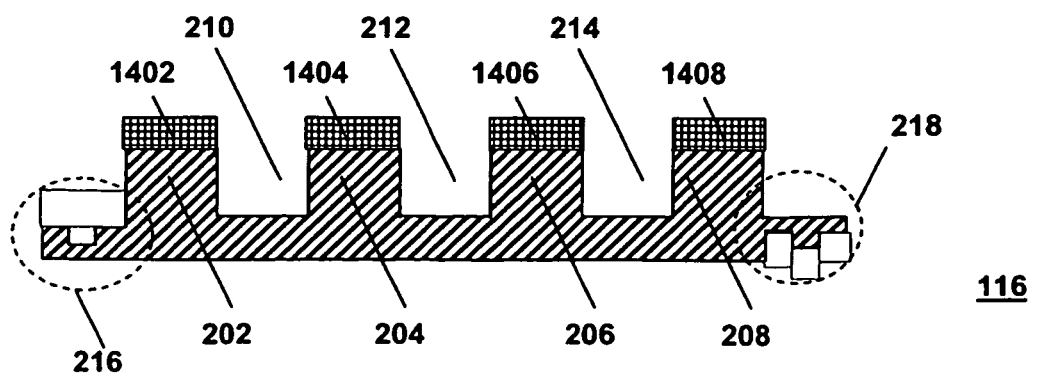
FIGS. 14, 15, 16 and 17 are respective diagrams of respective examples of a segment for a target object in the second apparatus.

For an example, reference is now had to FIG. 14 that illustrates a first example of a cross-section through the first segment 116, whose top surface is partly covered by a coating that contains magnetic particles. Taking the first embodiment 200, discussed above with reference to FIG. 2, the coating is applied so as to cover the elevations only of each of the plurality of segments 116-126. The first elevation 202 is covered with a layer 1402 containing magnetic particles. The second elevation 204 is covered with a layer 1404 containing magnetic particles. The third elevation 206 is covered with a layer 1406 containing magnetic particles. And the fourth elevation 208 is covered with a layer 1408 containing magnetic particles.

Figure 15:
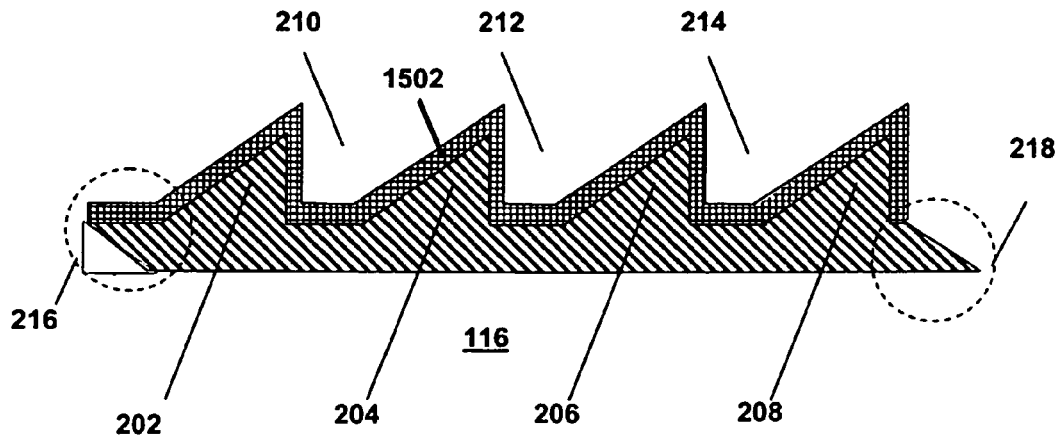

For another example, reference is now had to FIG. 15 that illustrates a second example of a cross-section through the first segment 116, whose top surface is entirely covered with a coating that contains magnetic particles. Taking the second embodiment 300, discussed above with reference to FIG. 3, the coating comprises a layer 1502 that covers the first elevation 202, the second elevation 204, the third elevation 206 and the fourth elevation 208, as well as the first recess 210, the second recess 212 and the third recess 214. Now the minimum distance between the layer 1502 and the sensor 112 varies periodically when the target object 114 moves past the sensor 112, thus enabling to encode the relative kinematic state of the first physical object 104 and the second physical object 106.

Figure 16:
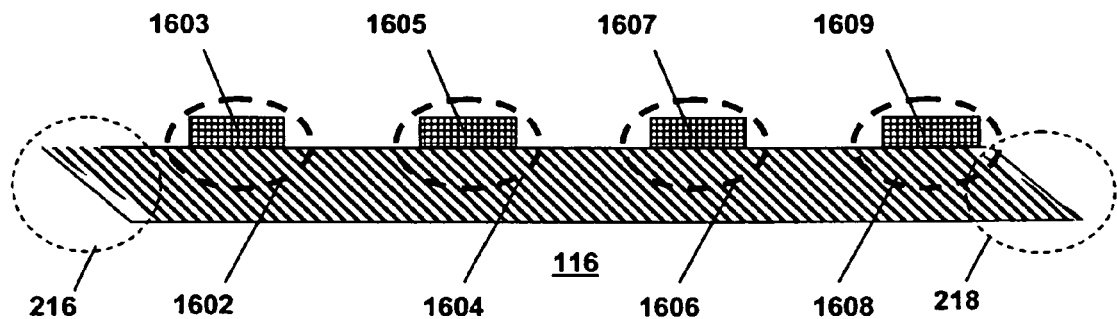

For yet another example, reference is had to FIG. 16 that illustrates a third example of a cross-section through the first segment 116, whose top surface is partly covered with a coating that contains magnetic particles. The top surface of the first segment 116 facing the sensor 112 is flat, i.e., is not profiled with a varying height. The top surface now accommodates a pattern of multiple regions covered with a coating containing magnetic particles. The regions are separated from one another by other regions from which the coating is absent. For example, a first region 1602 accommodates a first layer 1603 containing magnetic particles. A second region 1604 accommodates a second layer 1605 containing magnetic particles. A third region 1606 accommodates a third layer 1607 containing magnetic particles. A fourth region 1608 accommodates a fourth layer 1609 containing magnetic particles. When the target object 114 is moving past the sensor 112, the repeating pattern of the magnetic fields, generated by the magnetic particles in the first layer 1603, the second layer 1605, the third layer 1607 and the fourth layer 1609 enables to encode the relative kinematic state of the first physical object 104 and the second physical object 106.

Figure 17:
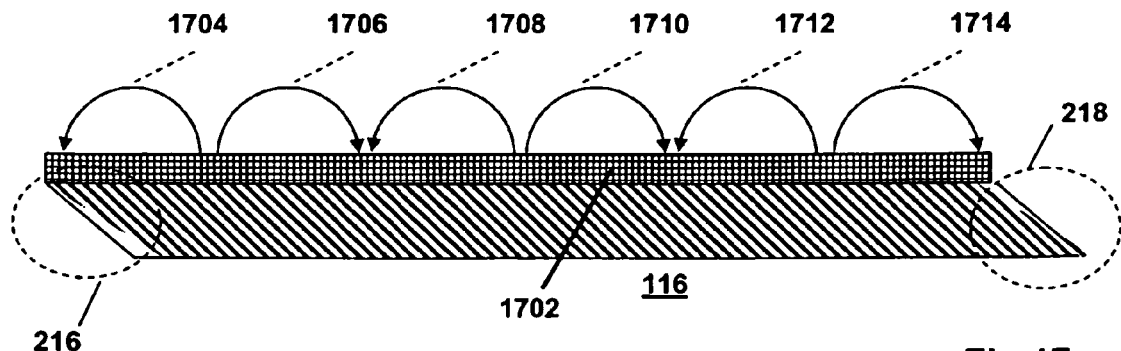

For still another example, reference is had to FIG. 17 that illustrates a fourth example of a cross-section through the first segment 116, whose top surface is covered with a coating that contains magnetic particles. The coating comprises a layer 1702 that contains magnetic particles. The layer 1702 is formed as, e.g., a Halbach array. As known, a Halbach array is a particular configuration of permanent magnets that reinforces the strength of the magnetic field on one side of the array while reducing the strength of the field to almost zero on the other side of the array. This is brought about by rotating the pattern of the magnetic field of a permanent magnet in the array relative to the next permanent magnet in the array. A significant portion of the resulting magnetic field has its field lines primarily running parallel to the top surface of the first segment 116, with alternating polarity. In the diagram of FIG. 17, a plurality of magnetic field lines have been drawn to illustrate the magnetic field of a Halbach array: a first magnetic field line 1704, a second magnetic field line 1706, a third magnetic field line 1708, a fourth magnetic field line 1710, a fifth magnetic field line 1712 and a sixth magnetic field line 1714. Going from left to right in the example of FIG. 17, the first magnetic field line 1704 has a counterclockwise orientation. The next, second magnetic field line 1706 has a clockwise orientation. The next, third magnetic field line 1708 has a counterclockwise orientation. The next, fourth magnetic field line 1710 has a clockwise orientation. The next, fifth magnetic field line 1712 has a counterclockwise orientation. The next, sixth magnetic field line 1714 has a clockwise orientation. Now, consider the target object 114 made up from the first segment 116, implemented with the layer 1702 formed as a Halbach array, and from the second segment 118, the third segment 120, the fourth segment 122, the fifth segment 124 and the sixth segment 126, all having configurations similar to the first segment 116. When the plurality of interlocking segments 116-126 are moving relative to the sensor 112, the magnetic field at the location of the sensor 112 changes accordingly. The relative kinematic state of the first physical object 104 and the second physical object 106 is then encoded in the attributes of the magnetic field generated by the target object 114.

Figure 18:
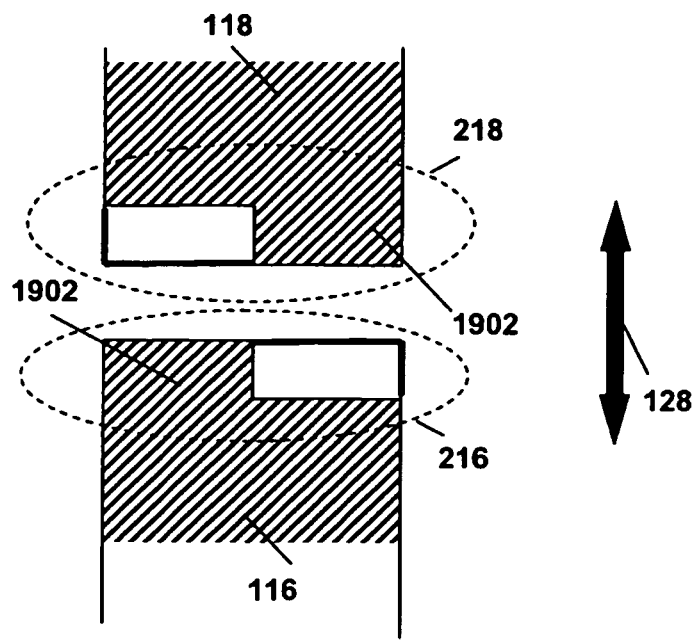
FIGS. 18, 19, 20 and 21 are diagrams of examples of interfaces for interlocking adjacent segments.

FIG. 18 illustrates a first example 1800 of a configuration of the first interface 216 of the first segment 116 and a complementarily shaped configuration of the second interface 218 of the second segment 118.

Figure 19:
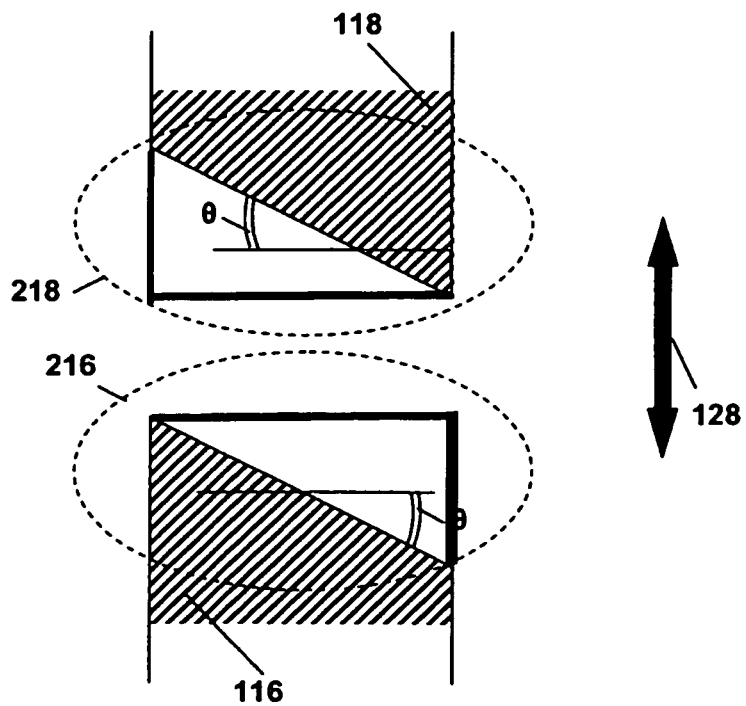

FIG. 19 illustrates a second example 1900 of a configuration of the first interface 216 of the first segment 116 and a complementarily shaped configuration of the second interface 218 of the second segment 118.

Figure 20:
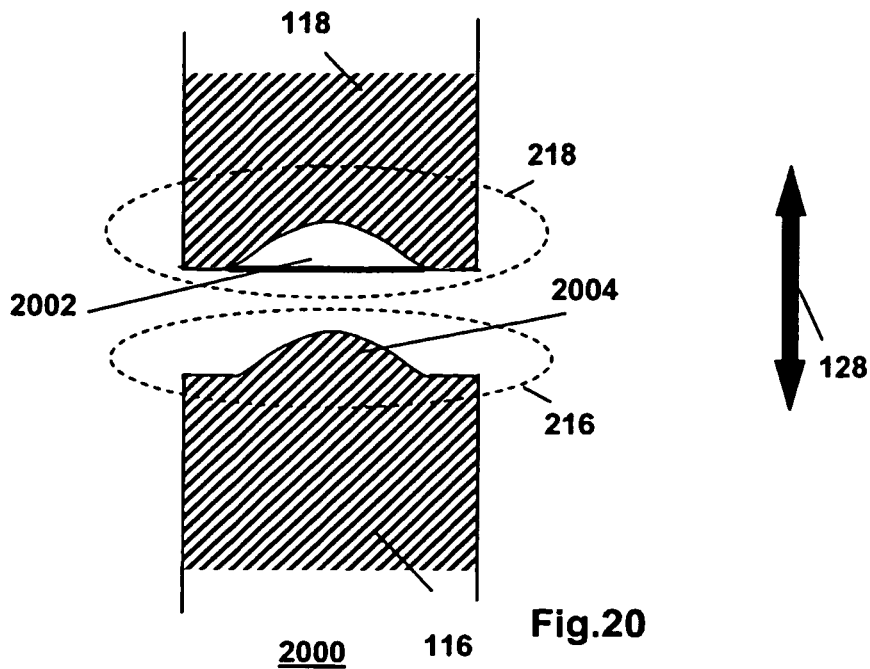

FIG. 20 illustrates a third example 2000 of a configuration of the first interface 216 of the first segment 116 and a complementarily shaped configuration of the second interface 218 of the second segment 118.

Figure 21:
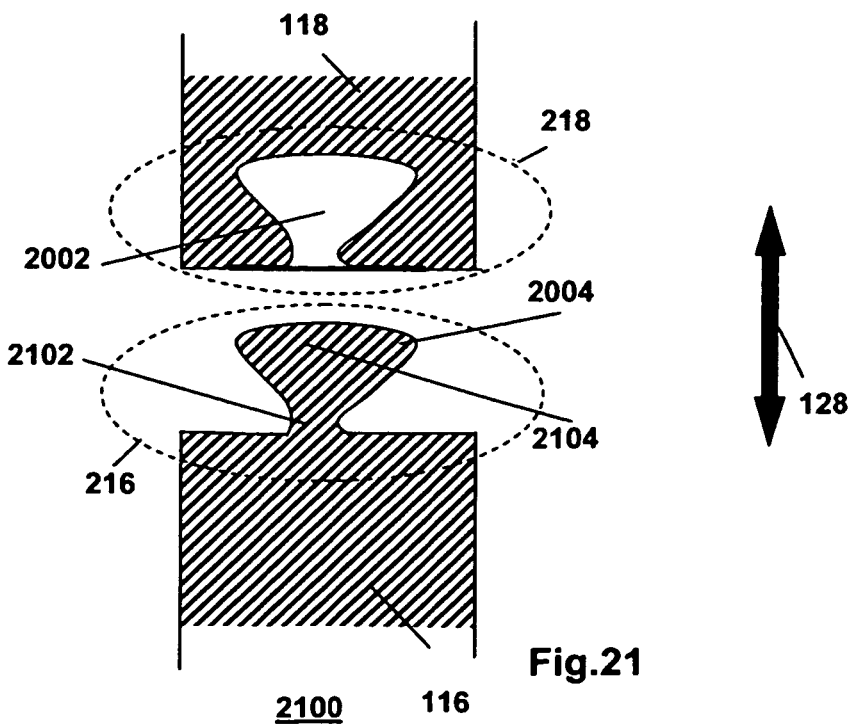

FIG. 21 illustrates a fourth example 2100 of a configuration of the first interface 216 of the first segment 116 and a complementarily shaped configuration of the second interface 218 of the second segment 118.

For clarity, FIGS. 18, 19, 20 and 21 only show the first interface 216 of the first segment 116 and the second interface of the second segment 218 as viewed from the position of the sensor 112 when facing the target object 114. That is, FIGS. 18, 19, 20 and 21 show top views of parts of the first segment 116 and the second segment 218. The portions of the first segment 116 and of the second segment 118 that are configured to affect the magnetic field at the location of the sensor 112 in operational use of the invention have been omitted. The direction of relative movement is indicated with the arrow 128 as in FIG. 1.

The first example 1800 in FIG. 18 illustrates a configuration of the first interface 216 and the second interface 218 for interlocking the first segment 116 and the second segment 118 using complementarily shaped teeth in a plane substantially perpendicular to a direction of the minimum distance between the sensor 112 and the target object 114. In the example shown, the first interface 216 has a first tooth 1802 and the second interface 218 has a second tooth 1904. Each of the first and second interfaces 216 and 218 may have more than a single tooth.

The second example 1900 in FIG. 19 illustrates a configuration of the first interface 216 and the second interface 218 for interlocking the first segment 116 and the second segment 118, wherein the first interface 216 and the second interface 218 are formed so as to leave an air gap in a plane that makes an angle θ relative to the direction of relative movement 128, wherein 0<θ<90°.

The third example 2000 of FIG. 20 illustrates a configuration of the first interface 216 and the second interface 218 for interlocking the first segment 116 and the second segment 118, wherein the second interface has a recess 2002 whose shape matches an extension 2004 in the first interface 216.

The fourth example 2100 of FIG. 21 illustrates a variation on the theme of the third example 2000, wherein the extension 2004 in the first interface 216 is narrower at a base 2102 of the extension 2004 than at a top 2104 of the extension 2004. The recess 2002 is shaped complementarily to the extension 2004. When the extension 2004 of the fourth example 2100 is positioned within the recess 2002 of the fourth example 2100, the position of the first segment 116 is fixed with respect to the second segment 218. The first segment 116 and the second segment 118 are locked in a manner similar to that of the pieces of a jig-saw puzzle.

Note that in the first example 1800, the second example 1900, the third example 2000 and the fourth example 2100 the seam, or air gap, that is formed between the first segment 116 and the second segment 118 when the segments interlock extends in the two dimensions of the planar view of the first segment 116 and the second segment 118. As a result, the air gap is not concentrated at a single, specific position of the target object 114 relative to the sensor 112, but is spread out at least in the direction of relative movement, as indicated by the arrow 128. The air gap will then have less influence on the magnetic field sensed at the location of the sensor 112, and the accuracy of the relative kinematic state as sensed is increased.

For completeness, the concatenation of the plurality of interlocking segments 116-126 can be topologically open or closed. An open concatenation stretches between two endpoints. The open concatenation can be used if the trajectory of relative movement of the first physical object 104 and the second physical object 106 stretches between a first end-point and a second end-point and is used in a to-and-fro movement. A closed concatenation is topologically equivalent to a circle. The closed concatenation fits a trajectory of the relative movement of the first physical object 104 and the second physical object 106 which forms part of, or is, a closed loop.

The invention claimed is:

1. An apparatus comprising:
a first physical component;
a second physical component; and
a sensor arrangement, wherein:
the first physical component and the second physical component are configured for moving relative to one another in operational use of the apparatus,
the sensor arrangement is configured for sensing a relative kinematic state of the first physical component and the second physical component,
the sensor arrangement comprises a magnet and a sensor,
the sensor is operative to sense a property of a magnetic field of the magnet at a location of the sensor,
the sensor is mounted stationary with respect to the first physical component,
the sensor arrangement comprises a target object that is mounted stationary with respect to the second physical component,
the target object is configured for affecting an attribute of the property in dependence on the relative kinematic state,
the target object comprises a plurality of interlocking segments,
the plurality of interlocking segments comprises a first segment and a second segment,
the first segment has a first interface and the second segment has a second interface,
the first interface and the second interface are configured for interlocking the first segment and the second segment,
a first shape of the first interface and a second shape of the second interface are formed spatially complementarily,
the first shape of the first interface extends in a first direction of the relative movement of the first physical component and the second physical component and has a first profile that varies in a second direction that is substantially perpendicular to the first direction, and
the second shape of the second interface extends in the first direction and has a second profile that varies in the second direction.

2. The apparatus of claim 1, wherein each of the first profile and the second profile varies linearly with distance in the second direction.

3. The apparatus of claim 1, wherein:
the magnet is mounted stationary with respect to the sensor,
each respective one of the plurality of interlocking segments comprises respective guiding means for guiding a flux of the magnetic field, and
the guiding means is operative to affect the attribute in dependence on the relative kinematic state.

4. The apparatus of claim 3, wherein,
the respective guiding means is formed as a respective top surface of the respective segment facing the first physical component, and
the respective top surface has a respective profile that varies over the respective segment along a direction of the moving of the first physical component and the second physical component relative to one another.

5. The apparatus of claim 4, wherein:
the respective profile has a respective first track and a respective second track running parallel to each other in the direction of the moving of the first physical component and the second physical component relative to one another,
the first track comprises a first sequence of first elevations and first recesses that are alternating in the direction of the moving of the first physical component and the second physical component relative to one another, and
the second track comprises a second sequence of second elevations and second recesses that are alternating in the direction of the moving of the first physical component and the second physical component relative to one another.

6. The apparatus of claim 1, wherein:
each respective one of the plurality of interlocking segments comprises a respective top surface facing the first physical object,
the magnet comprises a layer with magnetic particles,
the layer is accommodated on the respective top surface, and
the layer is configured to create the magnetic field that varies along the respective segment in the direction of the moving of the first physical component and the second physical component relative to one another.

7. The apparatus of claim 1, wherein:
the first physical component comprises an outer ring of a rolling element bearing,
the second physical component comprises an inner ring of the rolling element bearing,
the rolling element bearing comprises a plurality of rolling elements accommodated between the inner ring and the outer ring, and
the target object is shaped as a further ring that is mounted to the rolling element bearing and coaxially with one of the inner ring and the outer ring.

8. The apparatus of claim 1, wherein the plurality of interlocking segments have uniform shape.

9. The apparatus of claim 1, wherein the plurality of interlocking segments comprises segments having different material characteristics.

* * * * *